United States Patent [19]
Mansell

[11] 3,731,992
[45] May 8, 1973

[54] SPIRAL GROOVED LIQUID COOLED LASER MIRROR

[75] Inventor: Dennis N. Mansell, Palos Verdes, Calif.

[73] Assignee: The United States of America as represented by the Secretary of the Air Force.

[22] Filed: Apr. 6, 1972

[21] Appl. No.: 241,560

[52] U.S. Cl. .....................350/310, 350/61, 350/288
[51] Int. Cl. ..............................................G02b 5/08
[58] Field of Search........................350/63, 288, 299, 350/310, 61; 331/94.5

[56] References Cited

UNITED STATES PATENTS

| | | | |
|---|---|---|---|
| 3,637,296 | 1/1972 | McLafferty | 350/310 |
| 3,059,540 | 10/1962 | Robinson | 350/63 |
| 3,565,516 | 2/1971 | Thomas et al. | 350/63 |

*Primary Examiner*—Ronald L. Wibert
*Assistant Examiner*—Michael J. Tokar
*Attorney*—Harry A. Herbert, Jr. et al.

[57] ABSTRACT

A liquid cooled laser mirror having a mirror structure and a cover. A plurality of spiral grooves are located within the mirror structure while entrance and exit ports are located within the cover. Liquid enters through the cover entrance ports, circulates through the spiral grooves, and exits through the cover exit ports thereby cooling the mirror.

4 Claims, 2 Drawing Figures

PATENTED MAY 8 1973　　　　3,731,992

SPIRAL GROOVED LIQUID COOLED LASER MIRROR

BACKGROUND OF THE INVENTION

This invention relates generally to mirrors, and, more particularly, to liquid cooled mirrors utilized in laser systems.

The laser finds application in systems which are already in existence today. For example, lasers are found in the area of optical communications, holography, medicine, cutting, calculating and radar. In these areas the laser depends upon greatly amplifying its existing radiation. In order to accomplish such an increase in laser power it is necessary for the mirrors of the laser system to be sufficiently cooled to accommodate the greater power.

It becomes especially essential, in areas such as optical communication or optical radar to produce extremely high laser power. Heretofore, such amplication of laser power proved to be impractical because (1) the highly specialized cooling structure of the mirrors involved were unreliable in operation, i.e., failed to produce sufficient cooling and (2) a large expense was involved in producing a cooled mirror structure which could accommodate the large amounts of heat involved in the above mentioned laser techniques.

SUMMARY OF THE INVENTION

The liquid cooled mirror structure of this invention overcomes these primary objections to cooled mirror structures by producing a liquid cooled mirror which is highly reliable and of minimum construction cost.

The liquid cooled mirror structure set forth hereinbelow in detail utilizes the entire back portion of the mirror itself to enclose the cooling channels. The entire structure including the front of the mirror is then fabricated of a single piece of material. Such a simplified fabrication increases the mirror's structural strength while greatly decreasing the cost involved. Liquid enters under pressure to the cooling channels and travels across the back of the mirror at constant velocity. The cooling channels are of a spiral configuration which allows these channels to induce turbulence in the flow before exiting through exit apertures. The construction of the mirror of the instant invention produces sufficient cooling of the front of the mirror with a minimum of complicated construction procedures.

It is an object of this invention to provide a liquid cooled mirror which eliminates some of the soldering and brazing operations in previous mirror construction, therefore producing a more structurally sound cooled mirror.

It is another object of this invention to provide a liquid cooled mirror which produces sufficient cooling with a minimum of expense.

It is a further object of this invention to provide a liquid cooled mirror which is highly reliable in operation and can be extremely economical to mass produce.

For a better understanding of the present invention together with other and further objects thereof, reference is made to the following description taken in connection with the accompanying drawing and its scope will be pointed out in the appended claims.

DESCRIPTION OF THE PREFERRED EMBODIMENT

Figure 1:
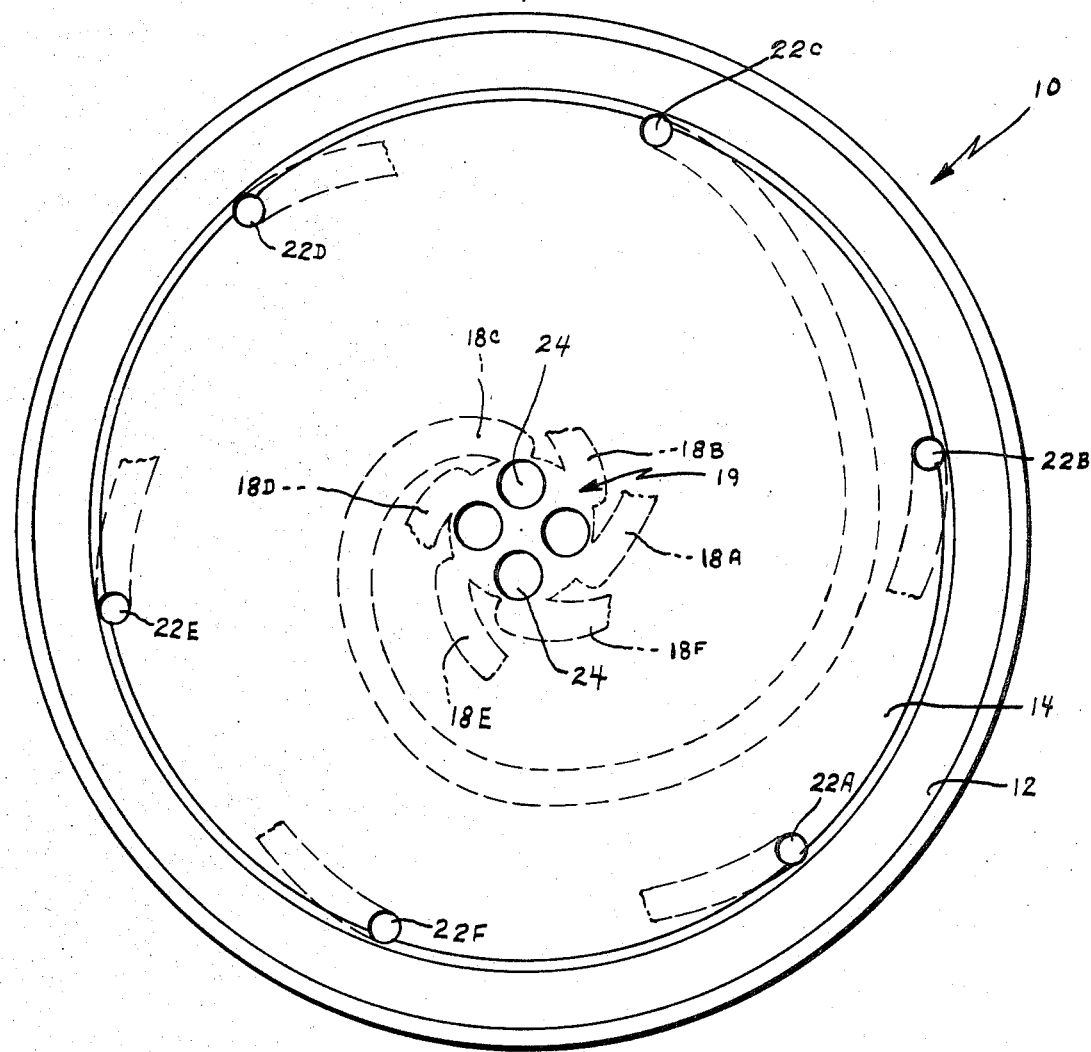
FIG. 1 is a plan view of the liquid cooled mirror of this invention showing the spiral cooling channels.
Figure 2:
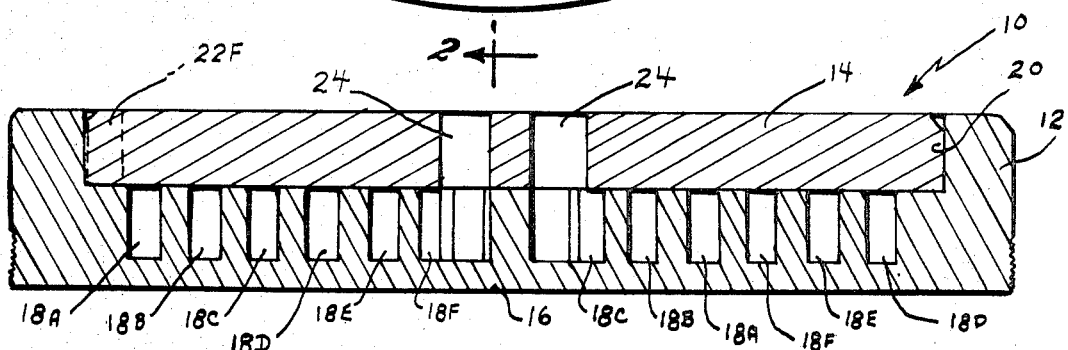
FIG. 2 is a cross-sectional view of the liquid cooled mirror of this invention taken along line 2—2 of FIG. 1.

Reference is now made to FIGS. 1 and 2 of the drawing which show in detail the liquid cooled laser mirror 10 of this invention. Because of its great cooling capacity, mirror 10 finds its major utility in the laser field, however, it should be noted that this invention also finds application in any field where a reliable and economical cooled mirror structure is desired.

The instant laser mirror 10 as shown in FIG. 2 is made of two basic sections, a mirror structure 12 and a cover 14. The mirror structure 12 has a reflective surface 16 on one side thereof and is made of any suitable reflecting material such as a highly polished metal. Opposite reflective surface 16 are a plurality of spiral grooves 18 (A–F) positioned within the structure 12 by any suitable method such as machining, terminating at a central manifold 19. Cover 14 is mounted within a recessed portion 20 of mirror structure 12 and has a plurality of ports 22 (A–F) therein representing the entrance to grooves 18 (A–F), respectively. Grooves 18 (A–F) converge at manifold 19 which leads to four equally spaced exit ports 24 located within the central portion of cover 14. It should be noted that although specific numbers of grooves 18, entrance ports 22, and exit ports 24 are shown in the drawing, any suitable number may be utilized without completely altering the inventive concept. However, it is also to be realized that optimum results may be obtained with the arrangement shown in the drawing.

In operation, liquid such as water enters through inlet or entrance ports 22 (A–F) and turbulence is induced thereto by means of the spiral configuration of grooves 18 (A–F). After cooling reflective surface 16, the coolant liquid flows to manifold 19 and exits through ports 24. This invention thereby provides a reliable and inexpensive system by which a mirror structure can be cooled.

Although the invention has been described with reference to a particular embodiment it will be understood to those skilled in the art that this invention is also capable of a variety of alternate embodiments within the spirit and scope of the appended claims.

I claim:

1. A liquid cooled mirror comprising a mirror structure and a cover, said mirror structure having a reflective surface on one side thereof, a plurality of spiral grooves terminating at a central manifold opposite said reflective surface on the other side thereof and a recessed portion, said cover being fixedly secured within said recessed portion of said mirror structure and having a plurality of entrance and exit ports therein, said entrance ports being connected to one end of said spiral grooves and said exit ports being connected to said central manifold whereby a liquid can continually flow through said mirror structure thereby cooling said reflective surface.

2. A liquid cooled mirror as defined in claim 1 wherein there are six spiral grooves.

3. A liquid cooled mirror as defined in claim 2 wherein each of said spiral grooves has its own entrance port.

4. A liquid cooled mirror as defined in claim 3 wherein there are four exit ports.

* * * * *